US006176406B1

United States Patent
Laumann (10) Patent No.: US 6,176,406 B1
(45) Date of Patent: Jan. 23, 2001

(54) SUPPORT DEVICE FOR REAR END ASSEMBLY OF VEHICLES

(75) Inventor: Wilfried Laumann, Bohmte (DE)

(73) Assignee: SMV-Metall GmbH, Bohmte (DE)

( * ) Notice: Under 35 U.S.C. 154(b), the term of this patent shall be extended for 0 days.

(21) Appl. No.: 09/142,345

(22) PCT Filed: Jan. 10, 1997

(86) PCT No.: PCT/EP97/00099

§ 371 Date: Aug. 12, 1998

§ 102(e) Date: Aug. 12, 1998

(87) PCT Pub. No.: WO97/25221

PCT Pub. Date: Jul. 17, 1997

(30) Foreign Application Priority Data

Jan. 12, 1996 (DE) .......................................... 296 00 485 U (51) Int. Cl.[7] .................................................. B60R 11/00
(52) U.S. Cl. .......................... 224/496; 224/281; 224/497; 224/502; 224/518; 224/533; 224/924
(58) Field of Search ........................... 224/281, 495–500, 224/518–521, 533, 924, 502, 532

(56) References Cited

U.S. PATENT DOCUMENTS

| 1,585,871 | * | 5/1926 | Pels ...................................... 224/497 |
| 3,039,634 | * | 6/1962 | Hobson et al. .................... 224/518 X |
| 3,176,903 | * | 4/1965 | Farley ................................ 224/521 X |
| 3,207,396 | * | 9/1965 | Mundell et al. ................... 224/518 X |
| 3,251,520 | * | 5/1966 | Van Dyke et al. ................ 224/518 X |
| 3,794,227 | * | 2/1974 | Stearns .............................. 224/518 X |
| 3,841,544 | * | 10/1974 | Berger ................................ 224/532 X |
| 3,891,132 | * | 6/1975 | Chandler ............................ 224/497 X |
| 4,336,897 | * | 6/1982 | Luck .................................... 224/924 X |
| 4,561,575 | * | 12/1985 | Jones .................................. 224/521 X |
| 4,676,415 | * | 6/1987 | Kennedy ........................... 224/496 X |
| 4,915,276 | * | 4/1990 | Devito ................................. 224/521 |
| 5,067,640 | * | 11/1991 | Gaskill ............................... 224/521 X |
| 5,215,232 | * | 6/1993 | Wyers ................................. 224/532 X |
| 5,373,978 | * | 12/1994 | Buttchen et al. ................. 224/924 X |
| 5,460,304 | * | 10/1995 | Porter et al. ...................... 224/521 |
| 5,570,825 | * | 11/1996 | Cona .................................. 224/924 X |
| 5,690,260 | * | 11/1997 | Aikins et al. ..................... 224/521 X |

FOREIGN PATENT DOCUMENTS

| 4131854 A1 | * | 4/1993 | (DE) ..................................... 224/518 |
| 4241008 A1 | * | 2/1994 | (DE) ..................................... 224/499 |
| 2642024 A1 | * | 7/1990 | (FR) ..................................... 224/521 |
| 2689468 A1 | * | 10/1993 | (FR) ..................................... 224/924 |

* cited by examiner

Primary Examiner—Gregory M. Vidovich
(74) Attorney, Agent, or Firm—Jordan and Hamburg LLP (57) ABSTRACT

A support device for a rear end assembly on motor vehicles, especially on campers, caravans or the like, is provided with two connecting elements which, on the one hand, carry a transporting frame, protruding from the rear of the vehicle and, on the other, are supported on a chassis. The connecting elements are formed by a sliding rail, which has a guiding and holding profiling and at which the transporting frame 6, as well as additional supporting elements for transported goods can be fixed as pivotable, foldable and/or extendable add-ons.

2 Claims, 12 Drawing Sheets

SUPPORT DEVICE FOR REAR END ASSEMBLY OF VEHICLES

BACKGROUND OF THE INVENTION

The invention relates to a support device for a rear end assembly on motor vehicles, especially on a camper, caravan or the like.

A known support device of this type (is disclosed in German Utility Patent 91 09 357.0). A transporting frame, protruding from the rear of the vehicle is held in the use position by two supporting struts, which extend parallel to the longitudinal axis of the vehicle and engage the frame parts of the vehicle on the chassis side. In the installed position, these supporting struts keep the transporting frame at a constant distance from the rear. Even when the transporting frame is not in use, the supporting struts remain in this installed position and have to be dismantled completely in order to free up the rear region, so that such a support device requires much space and has a disadvantageously limited operating comfort.

SUMMARY OF THE INVENTION

It is an object of the invention to provide a support device for a rear end assembly at motor vehicles, the components of which permit different goods, which are to be transported, to be accommodated with little technical effort on a widely variable loading surface, can be positioned with little adjusting effort in a space saving idle or inoperative position and, in this position, can be carried along at the rear of the vehicle.

The invention provides a support device, the sliding rails of which, provided with guiding and holding profiling, form a basic structural unit, which can be accommodated in the rear region of the vehicle frame in supporting positions defining different loading surfaces. At these sliding rails, different goods, which are transported, such as bicycles, 2-wheel motor vehicles, etc. can be accommodated over supporting elements forming direct supporting points and held additionally by the transporting frame. Over the guiding and holding profiling of the sliding rails, the support device has variable possibilities for adjusting the supporting elements, so that, with little effort for the adjustment, a change in the loading surface and/or the fastening possibilities for the goods being transported is achieved.

From the transporting position, supported in front of the rear region of the vehicle, all components of the supporting device can be moved over swiveling, folding and/or plug-in connections in such a manner, that the support device can be positioned in a compact packed position in the immediate vicinity of the floor of the vehicle frame and, with that, the support device can be carried along permanently at the rear region of the vehicle, for example, a camper, without requiring much space and without affecting the comfort.

With respect to further advantages and details of the invention, reference is made to the following description and the drawing, in which several examples of the object of the invention are illustrated diagrammatically in detail.

BRIEF DESCRIPTION OF THE DRAWINGS

Figure 1:
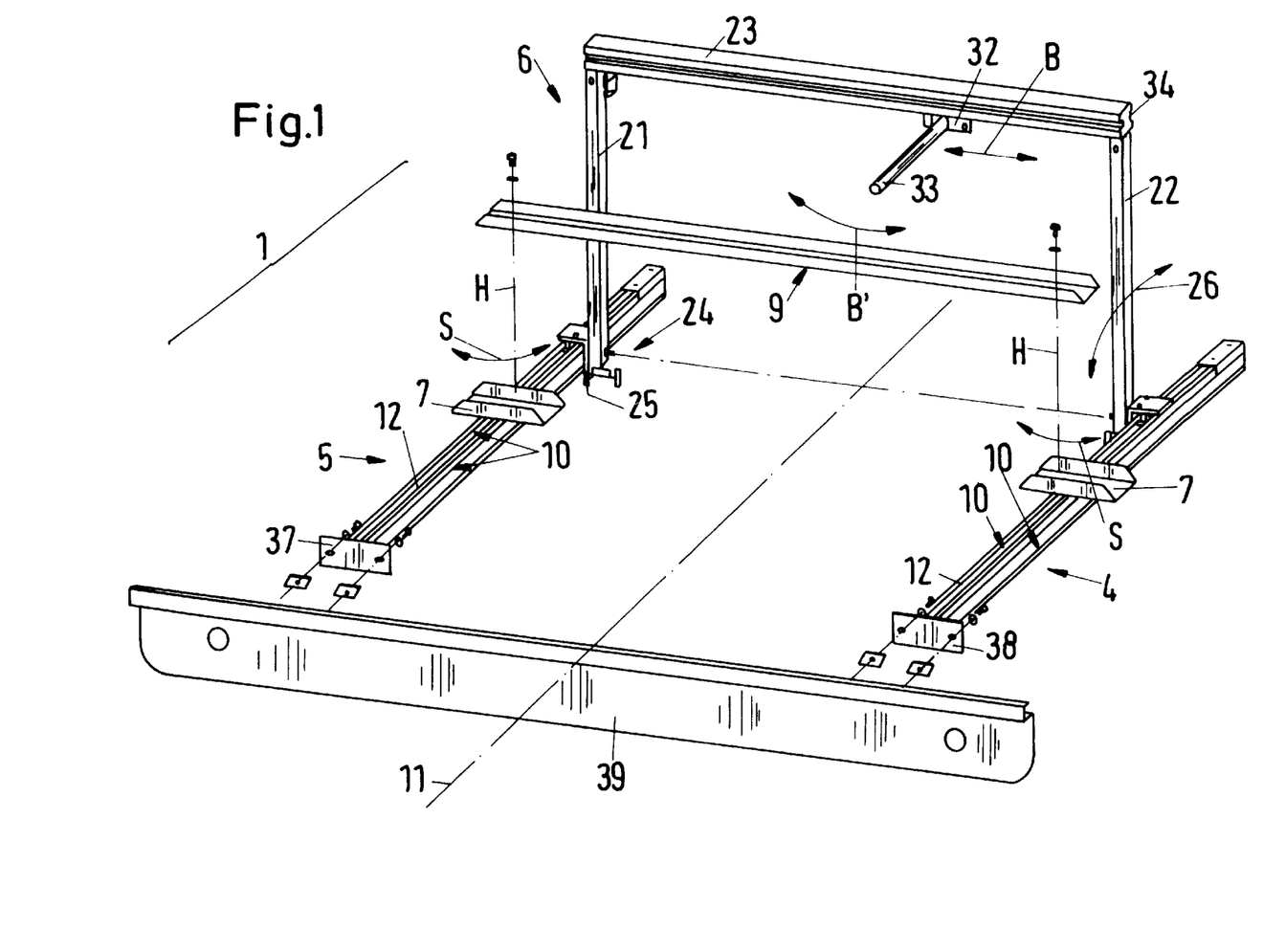
FIG. 1 shows a perspective detailed representation of an inventive support device with a transporting frame and additional supporting elements on two parallel sliding rails for the goods being transported.

In FIG. 1, a support device, which is labeled 1 as a whole, for the rear-side attachment to a motor vehicle is illustrated. It is provided with two sliding rails 4, 5, forming the connecting elements to the chassis parts 2, 3 (FIG. 2) of the vehicle frame, which sliding rails 4, 5, in turn, are completed with a transporting frame 6 to the support device 1.

In an inventive development, the support device 1 has sliding rails 4, 5, which are constructed, for example, as one-piece extruded profile components with guiding and holding profiling 10. By means of this profiling 10, on the one hand, the transporting frame 6 and additional supporting elements 7, 8 can be fixed in the use position as pivotable, foldable and/or insertable add-on parts and, on the other, the sliding rails 4, 5 can be supported in different pull-out positions at the chassis parts 2, 3.

In the use position of the support device 1 (FIG. 1), the sliding rails as well as the transporting frame 6 and the support elements 8, 9 are fixed over a detachable connecting engagement, illustrated in the exploded representation. All components can be swiveled, folded and/or inserted out of this use position, supported in front of the rear region of the vehicle, in the nature of a folding luggage rack, so that the support device 1 can be accommodated in a compact packed position close to the end of the chassis (partially shown by broken lines in FIG. 7). In this way, the rear region of the vehicle becomes freely accessible. In this connection, it is conceivable to construct the components of a light metal so that the empty weight is advantageously low. In the embodiments of the support device 1, shown in FIGS. 1, 2 and 7, the support device 1 is constructed with in each case two sliding rails 3, 4, accommodating the add-on parts. Likewise, it is conceivable to construct the support device with a single guiding rail (not shown).

The two sliding rails 4, 5 are provided as essentially identical components, forming a basic structural unit of the support device 1. In the installed position shown, the two sliding rails 3, 4 are disposed symmetrically to a longitudinal center plane 11 defining the longitudinal axis of the vehicle, so that the following description of the support device 1 can be limited essentially to one side of the sliding rail pair 4, 5 and identical components are provided with corresponding reference numbers.

Figure 6:
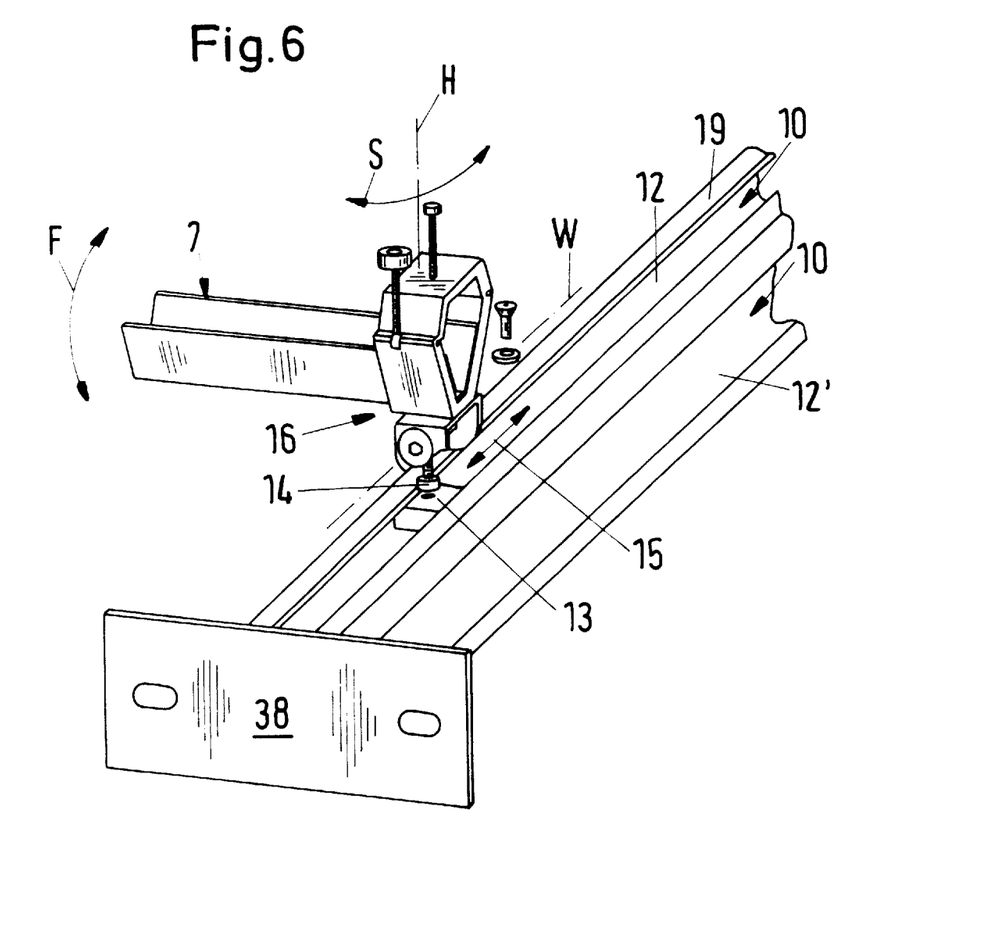
FIG. 6 shows an enlarged sectional representation of the sliding rail in the region of connection to a supporting element for the goods being transported in the use position.

The enlarged sectional representation of the sliding rail 4 of FIG. 6 shows that this is provided with a longitudinal groove 12, forming the holding profiling 10 and fixing the transporting frame 6 (FIG. 1) as well as the supporting elements 7, 8. In an appropriate construction, a clamping body 13 is provided in the longitudinal groove 12. The add-on parts 6 or 7, 8 are held over the screw connection part 14 of the clamping body 13 and over a connecting part 16 (FIGS. 4 and 6).

Figure 4:
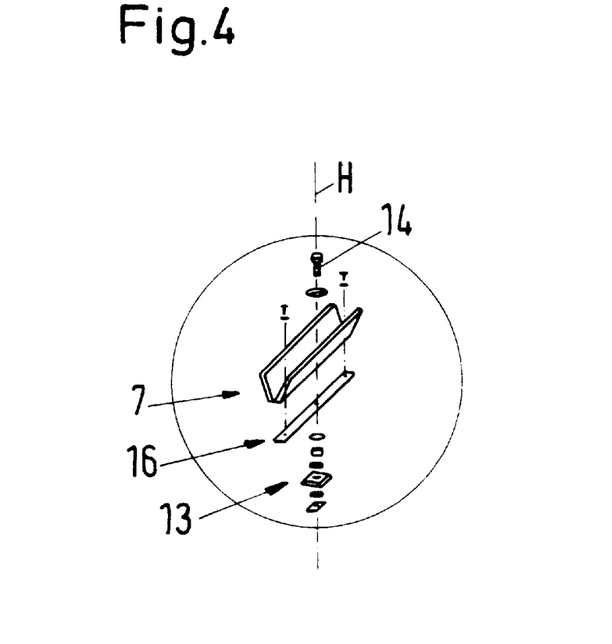
FIG. 4 shows an enlarged detailed representation of one of the supporting elements for the goods being transported, with detachable connecting parts to the sliding rail.

The exploded representations of FIGS. 4 and 6 show that, after the respective screw connection part 14 is undone or loosened, the assigned add-on parts 6 or 7, 8 can be shifted in the longitudinal groove 12 (arrow 15 in FIG. 6), so that the support device therewith offers, in the region of the add-on parts 6, 7, use positions that can be adapted to different goods that are to be transported (not shown). Moreover, the supporting elements 7 can be swiveled (arrow S) about their vertical holding axis H through 180° in such a manner that the sliding rails 4, 5 and the supporting element 7' are placed in a parallel position (FIGS. 1 and 7) or, for accommodating the supporting element 8, the elements 7 extend opposite to one another. In the case of a construction of the connecting part 16 as a tilting holding device with a pivoting axis W (FIG. 6), the supporting element 7 can additionally be swiveled in this axis in the direction F.

Figure 5:
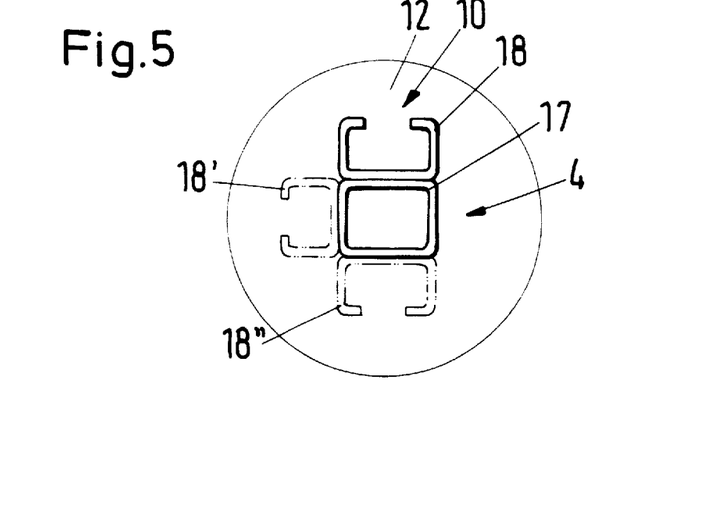
FIG. 5 shows a cross-sectional representation of the sliding rail consisting of two hollow profile parts.

In the representation of FIG. 5, the sliding rail 4 is shown in an end view. The essentially rectangular cross-sectional contour of the sliding rail 4 is evident as the guiding profiling, which can be introduced into the hollow profile of the chassis parts 2, 3. In this embodiment, the sliding rail 4 is constructed as a square tubular part 17, which is provided with a profile shoulder part 18, having a longitudinal groove 12. In different connection positions (shown with lines of dots and dashes), this part 18 can be fixed at part 17 in such a manner, that the sliding rail 4 offers different holding profile regions for the supporting elements 7 or the supporting frame 6. Likewise, it is conceivable to dispose several profile shoulder parts 18, 18', 18" simultaneously at a square, tubular part 17 and to provide the region of the sliding rail 4, 5, subjected to friction during the sliding motion, with an abrasion resistant attachable part, such as a plastic rail, so that the device 1 can be operated simply.

Figure 2:
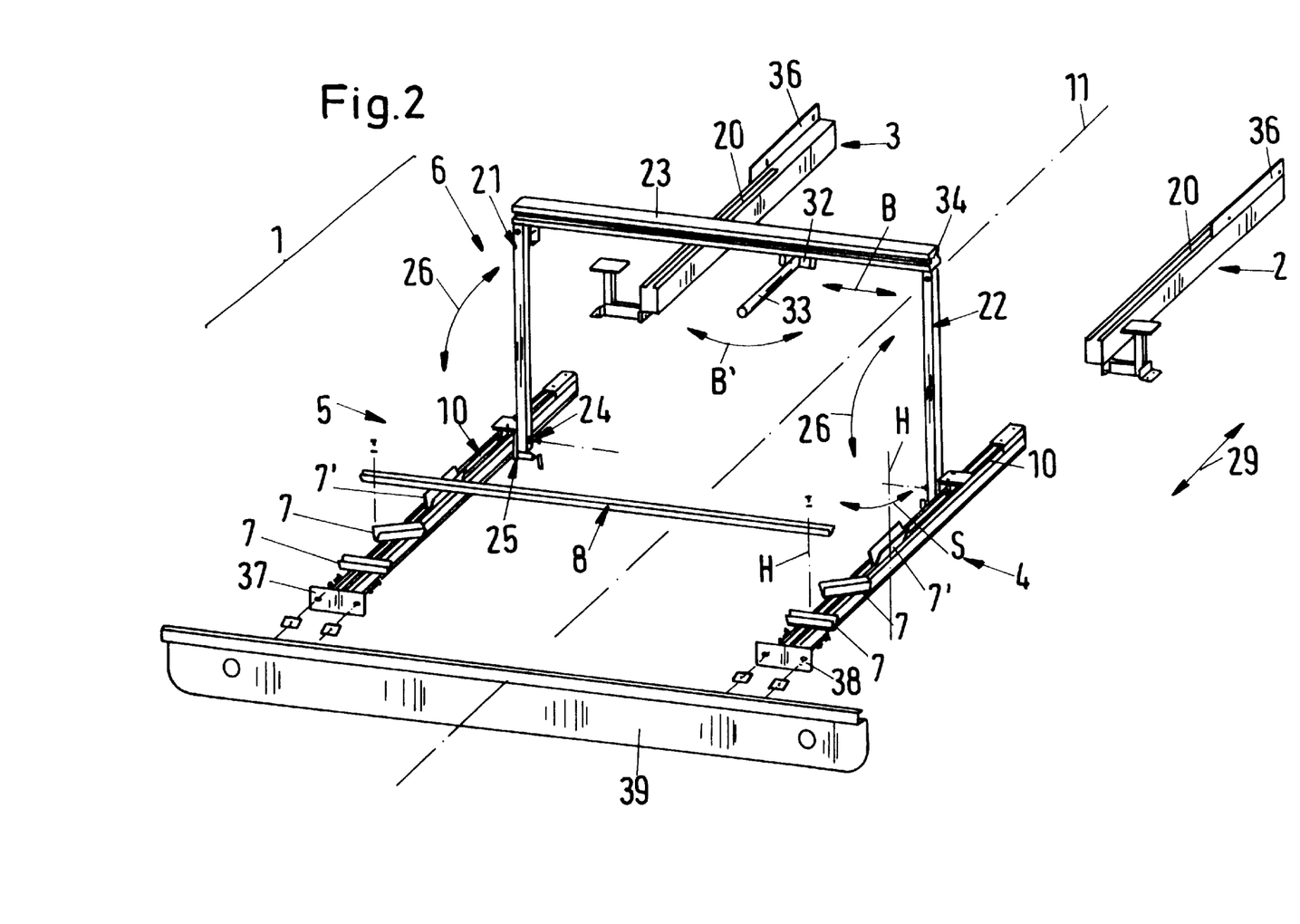
FIG. 2 shows an exploded representation, similar to that of FIG. 1, with altered supporting elements for the goods being transported and respective hollow profiles in the region of the chassis for accommodating the sliding rails.
Figure 3:
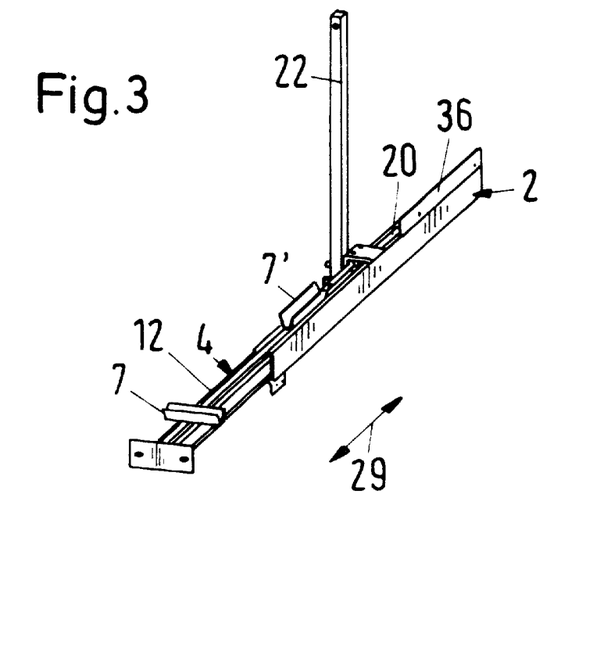
FIG. 3 shows a detailed representation of the support device in the region of one of the sliding rails supported in the hollow profile of the chassis.
Figure 8:
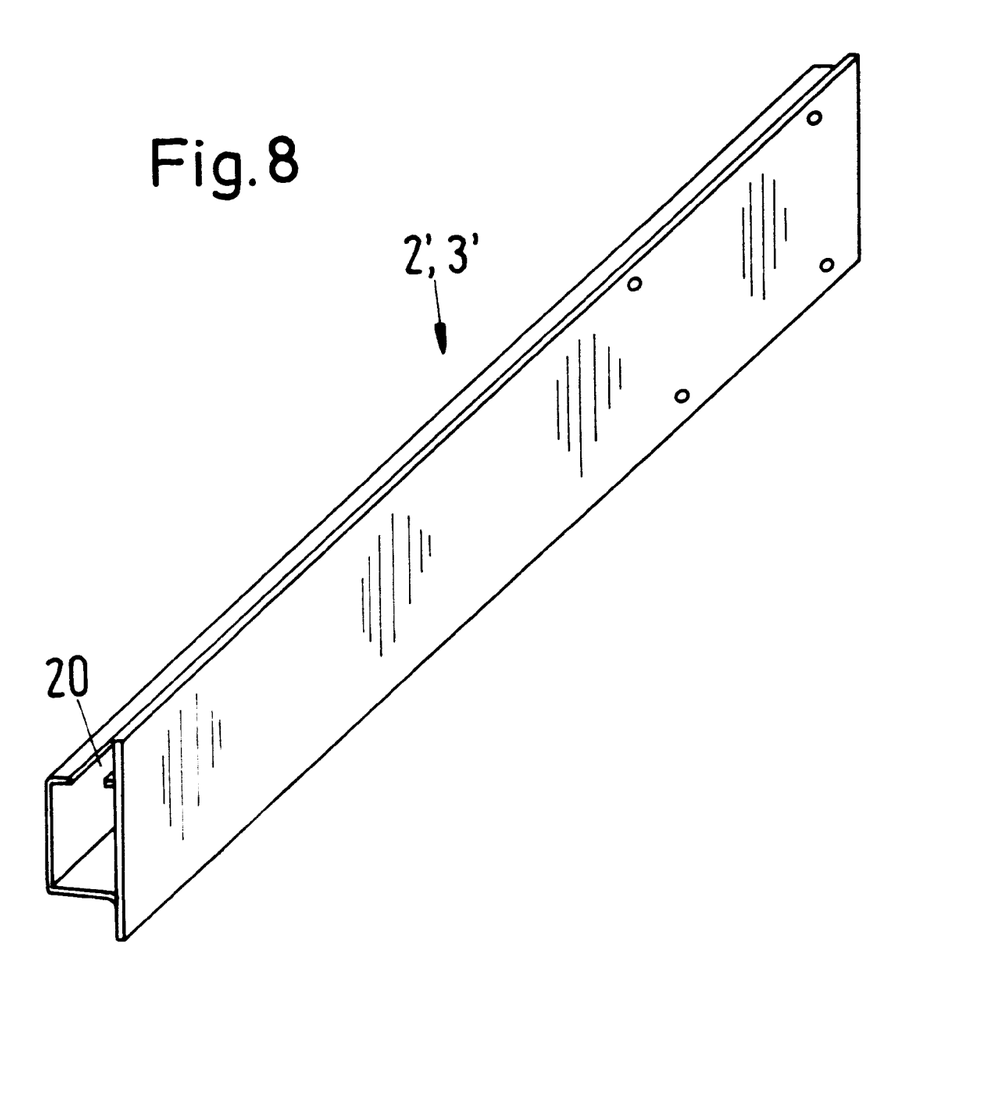
FIG. 8 shows a detailed representation of the hollow profile of the chassis in a second embodiment.

In the embodiments of the sliding rails 4, 5 of FIGS. 1 to 3, these sliding rails are constructed in each case as one-piece extruded profile parts. In the installing position shown, the longitudinal groove 12 is provided in each case in an upper profile surface region 19. With that, the longitudinal groove 12, when in the position (FIG. 3), in which the sliding rail 4 is connected with the hollow profile of the chassis part 2, can be positioned in such a manner, that the longitudinal groove 12 corresponds with a longitudinal slot 20 of the chassis part 2 or 3. At the same time, the two components engage one another in the form of a telescoping assembly and the supporting elements 7, 7', swiveled parallel to one another can be moved into the pushed-in position (FIG. 3). In FIG. 8, a second embodiment of the hollow profile part forming the respective chassis parts 2', 3' is shown.

In the embodiments shown, the transporting frame 6 is provided in each case with two strut parts 21, 22, one end of which is supported at the respective sliding rails 4, 5 and at the other end of which they are connected over a bridging strut 23, which extends essentially horizontally and transversely to the center longitudinal plane 11. In the region of the sliding rails 4, 5, the strut parts 21, 22 are supported over a holding body 25 forming a drag link 24, so that the transporting frame 6 can be shifted over a pivoting motion (arrow 26, FIG. 1) counter to the driving direction out of the vertical use position shown into an inoperative position, which is essentially parallel to the ground and parallel to the respective sliding rails 4, 5. In addition to this possible pivoting adjustment, the strut parts 21, 22, in order to attain a compact inoperative position, can also to be formed from two parts 27, 28 (movement arrow T), which can be folded and/or telescoped in the middle region (FIG. 7) so that, when not in use, the transporting frame 6 can be brought into the inoperative position indicated by broken lines. The strut parts 21, 22 are assembled in the sliding direction (arrow T) and lowered in the pivoting direction (arrow A) in such a manner that, after a sliding motion (arrow 29 in FIG. 7), the support device 1 lies against the end region of the two chassis parts 2, 3 in a space-saving packed position.

The bridging strut 23, in an appropriate embodiment, has a profiling 34 supporting a holding rod 33 over a flange part 32 in such a manner that the holding rod 33 can be moved horizontally (arrow B), transversely to the longitudinal center plane 11, in order to accommodate different goods that are to be transported, and can be swiveled towards the bridging strut 31 (arrow B').

In an appropriate embodiment, after the swiveling motion (arrow S), the supporting elements 7 take up in the opposite use position the supporting element 8, which is intended, for example, as a transverse bicycle carrier (FIG. 2) or as a motorcycle pan (FIG. 1).

Figure 7:
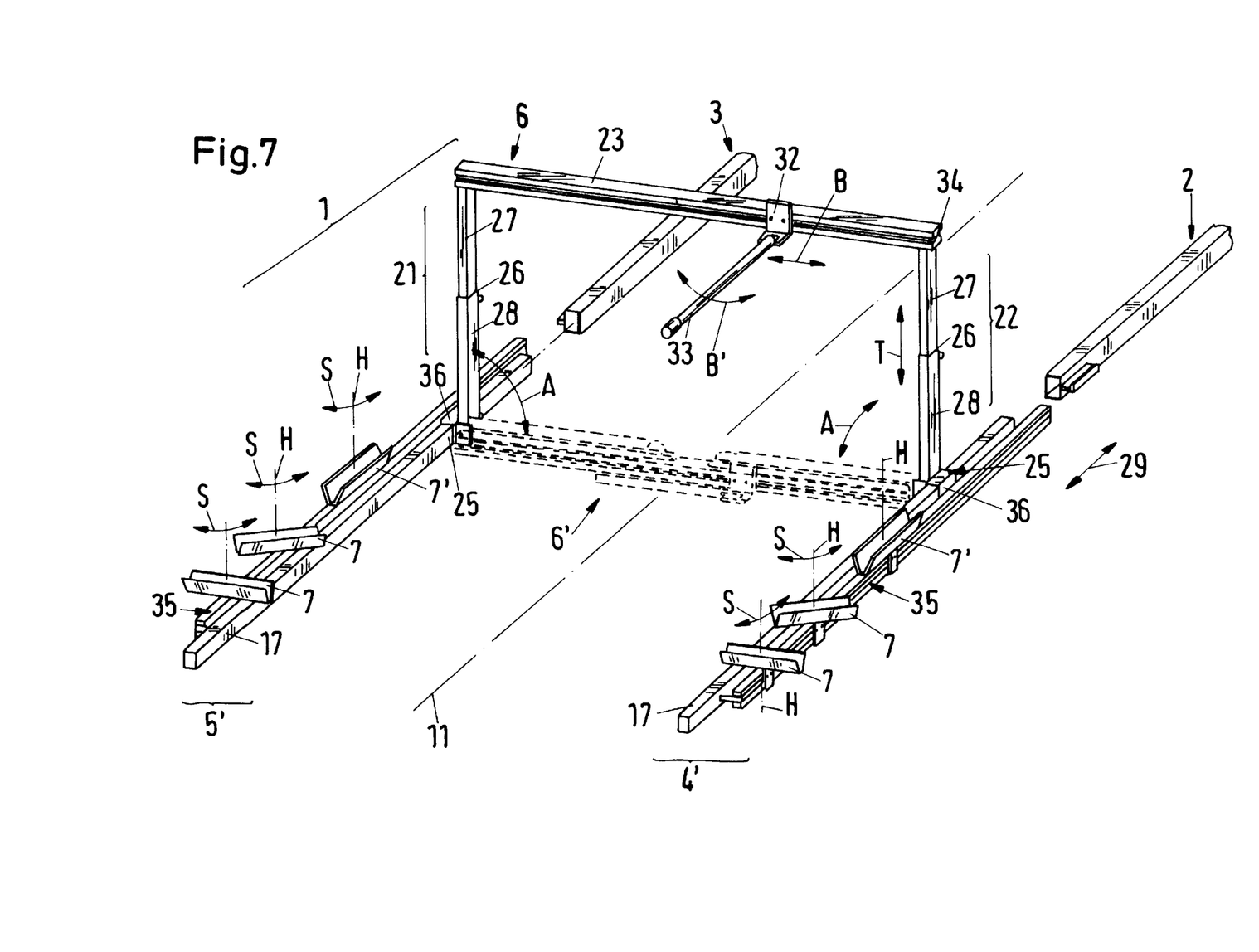
FIG. 7 shows a diagrammatic representation of the support device in a second embodiment.

In the embodiment of the support device 1 of FIG. 7, the respective sliding rails 4', 5' are provided with an additional rail 35, which can be introduced into the hollow profile part 2, 3 of the chassis (similar to the profiled stop part 18 of FIG. 5) and is disposed parallel to the sliding rails 4', 5'. Moreover, the supporting elements 7, 7' are held at this additional rail 35 and the transporting frame 6 is fixed to the inner square pipe part 17 over the holding body 25, which is constructed as a sliding sleeve 36.

To limit the displacement path of the sliding rails 4, 5, a stop (not shown) may be provided at one end of these sliding rails 4, 5. The stop part can be moved against a contacting part 36 in the region of the chassis parts 2, 3 (FIG. 2). At their free ends, the sliding rails 4, 5 are provided with flange plates 37, 38, at which a sheet metal bumper 39, carrying further add-on parts (not shown), is disposed.

Figure 9:
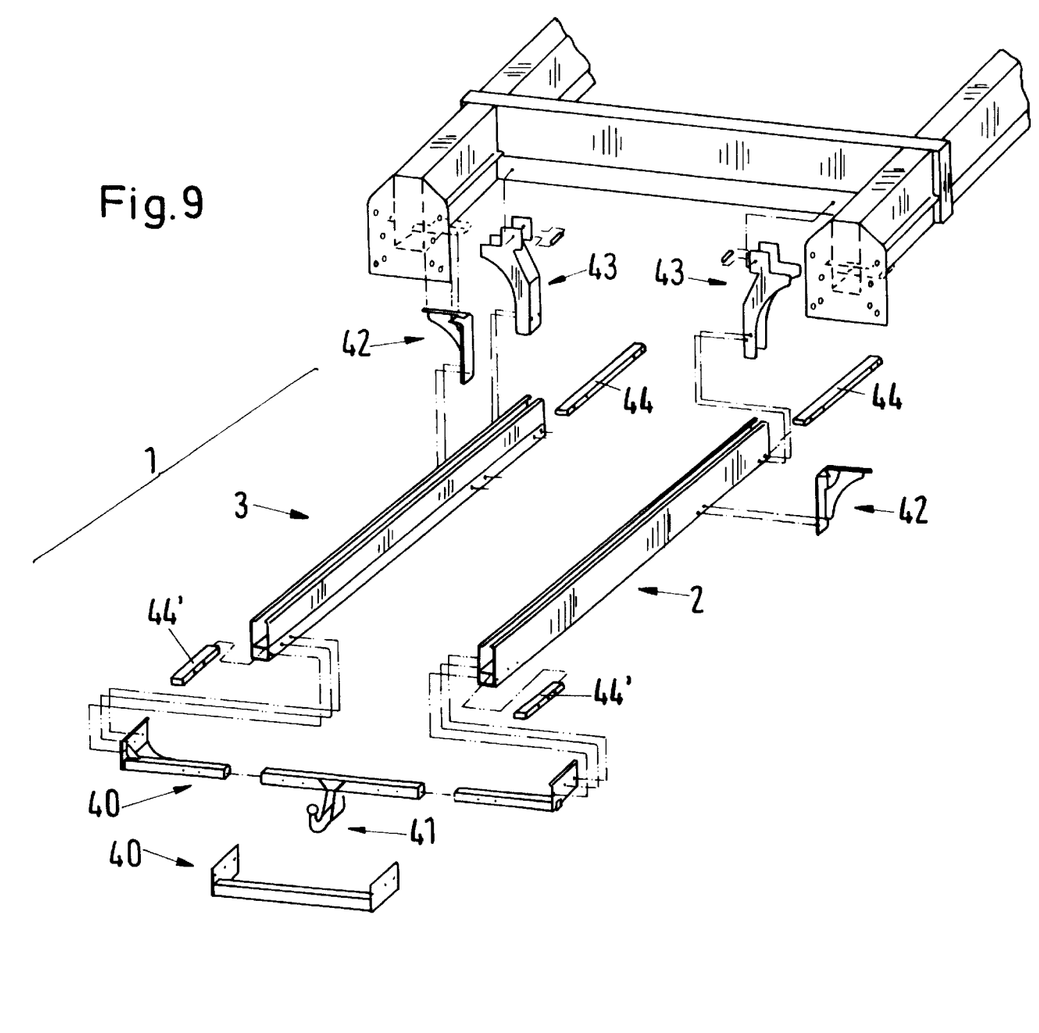
FIG. 9 shows a perspective representation of the support device with a drawbar coupling.

In FIG. 9, the support device 1 with a drawbar coupling 41 is shown, which can be fixed between chassis parts 2 and 3 over a transverse support 40, formed by several individual components in such a manner, that the sliding rails, which are not shown, can be brought into their use position (as in FIG. 7). With the components of the transverse support 40, an additional stabilization of the support device 1 is attained. In an appropriate embodiment for supporting the chassis parts 2, 3 at the vehicle frame, for example, at different types of vehicles, such as a touring car and a van or the like, the support device 1 has adaptable adapters 42, 43, into the connecting region of which additional supporting struts 44 are pushed into the chassis parts 2, 3. At the other end, supporting struts 44' are provided, with which the components of the drawbar coupling 41 can be accommodated in a stable manner.

Figure 10:
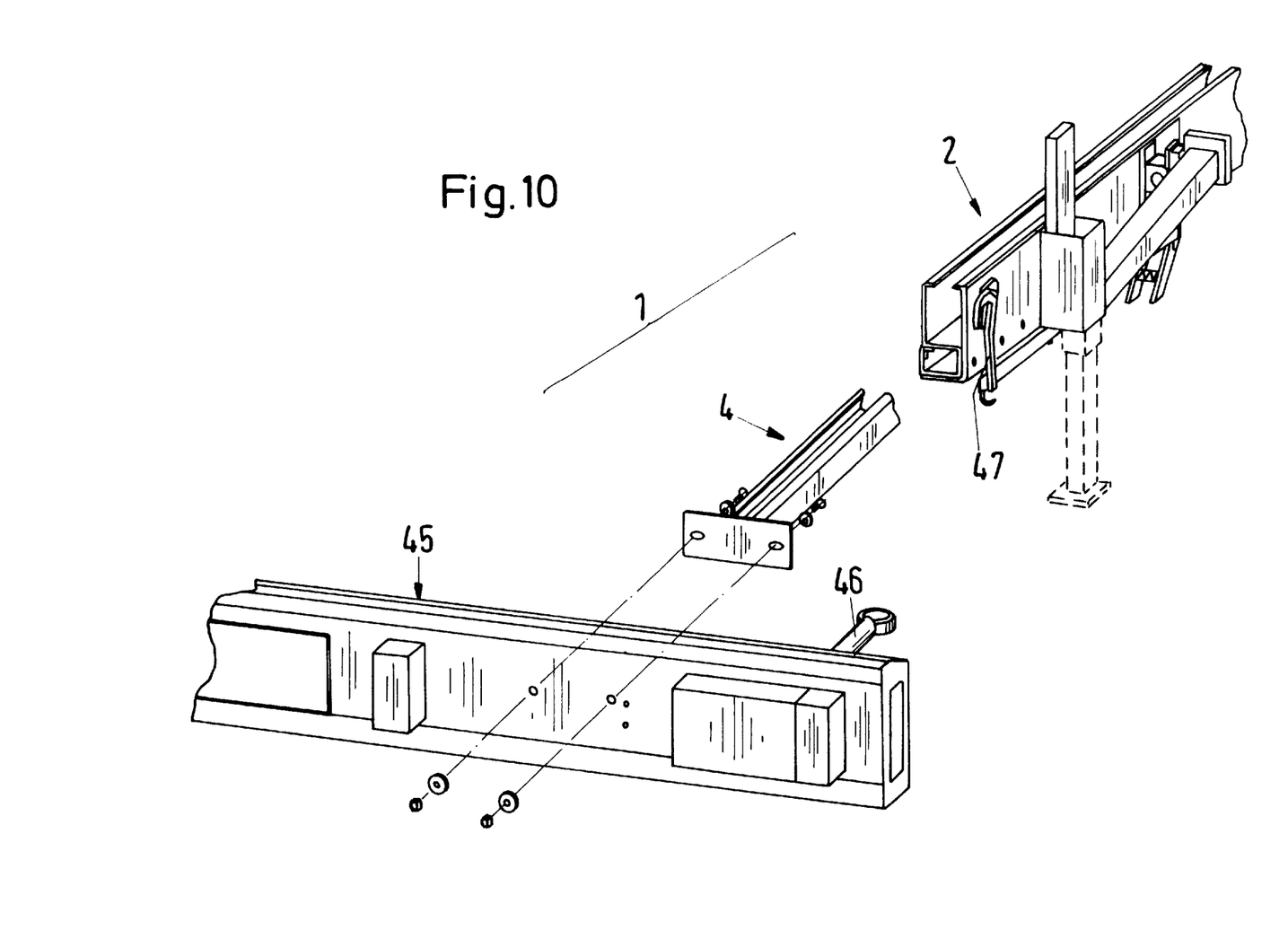
FIG. 10 shows a perspective sectional representation of the support device with a bumper.

In FIG. 10, a perspective sectional representation illustrates the connecting region of a bumper 45 in the region of the support device 1 and at the sliding rail 4. For fixing the position of the bumper 45, a hook part 47, engaging a counter element 46, is provided at the chassis 2.

Figure 11:
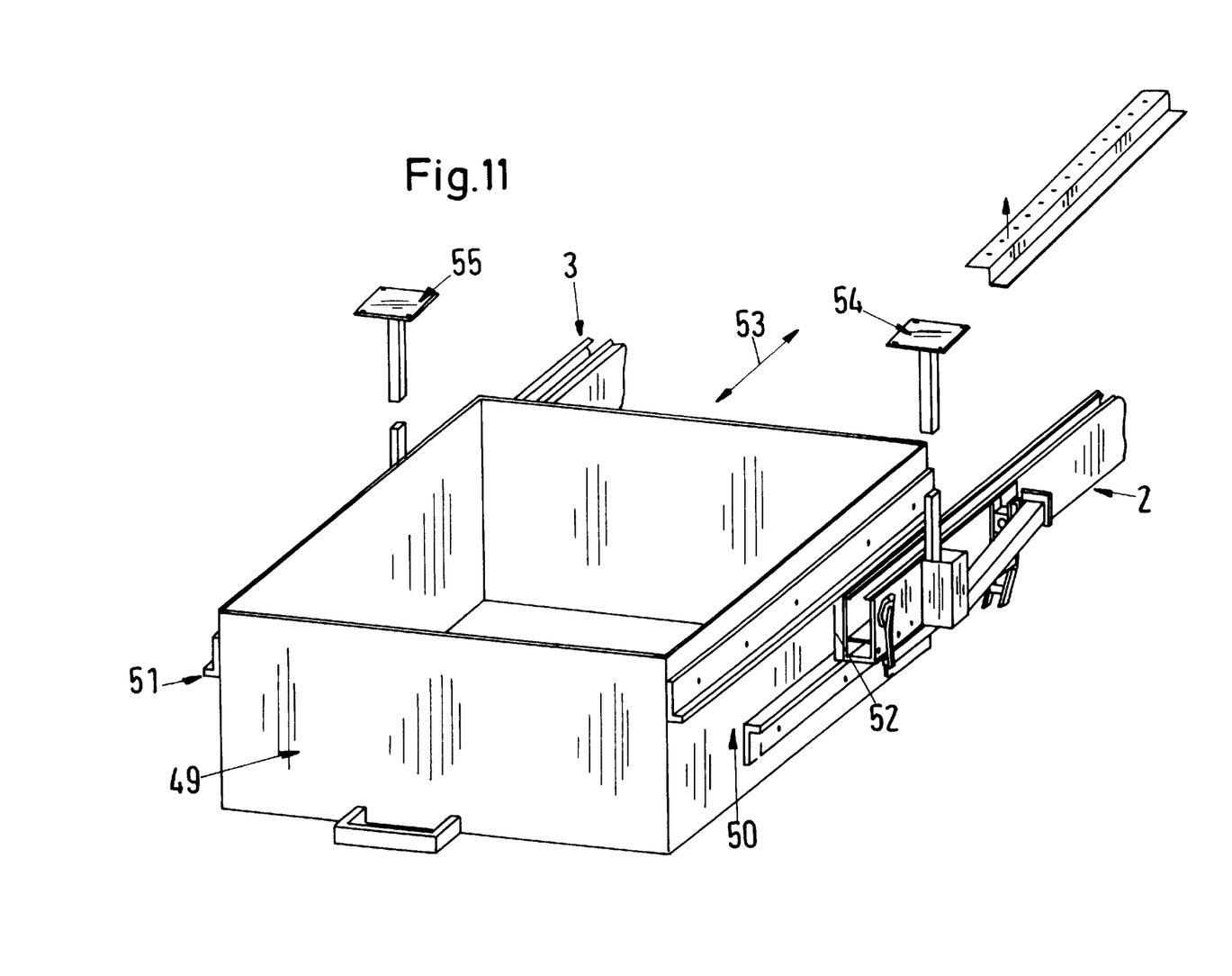
FIG. 11 shows a perspective sectional representation of the support device with a drawer as add-on piece.

In FIG. 11, a further embodiment of the support device 1 is shown, in which a drawer 49 is provided as add-on part between the chassis parts 2, 3 of the device 1. The drawer 49 has lateral guiding struts 50, 51 which, over a supporting plate 52, make the horizontal movement (arrow 53) possible. The chassis parts 2, 3 are fixed over holding props 54, 55 at the bottom of the vehicle in order to absorb high weight forces.

Figure 12:
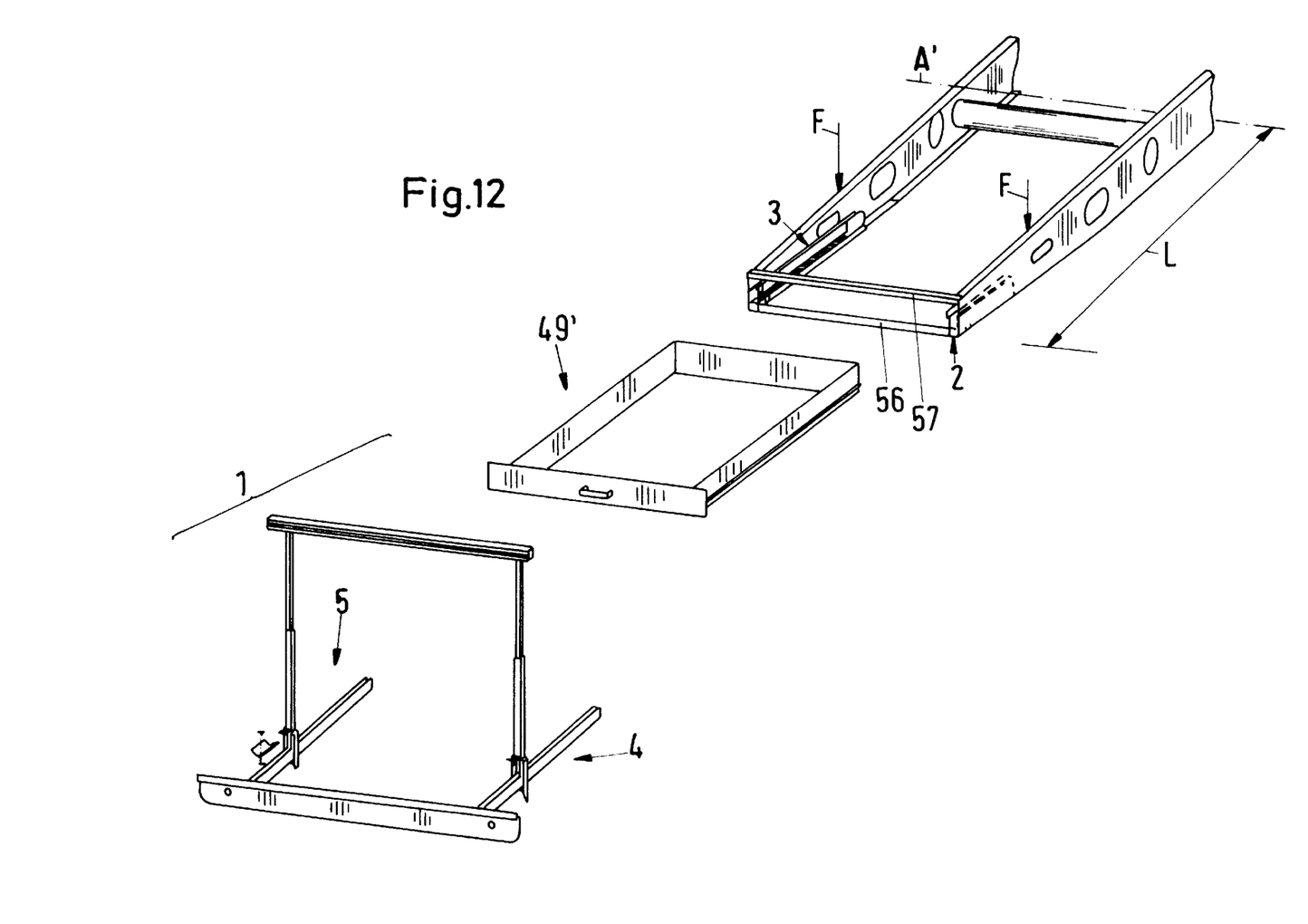
FIG. 12 shows a perspective representation similar to FIG. 11 with reinforcing struts in the region of the drawer.

In FIG. 12, the drawer 49' is shown in an exploded representation with the support device 1 and the parts 2, 3 located at the chassis (similar to FIG. 2). The chassis here has a length L, which protrudes over a transverse axis A, such as the rear wheel axle, so that a weight load, corresponding to the superstructure of, for example, a caravan, is acting (arrow F). Already with the drawer 49, which forms a stiff component, an advantageous stiffening is achieved in the pushed-in position in this region of the vehicle frame. In an appropriate embodiment, additional struts 56, 57 (FIG. 12) can also be provided, with which the above-described stiffening effect can be improved even further.

Figures 13, 14, 15:
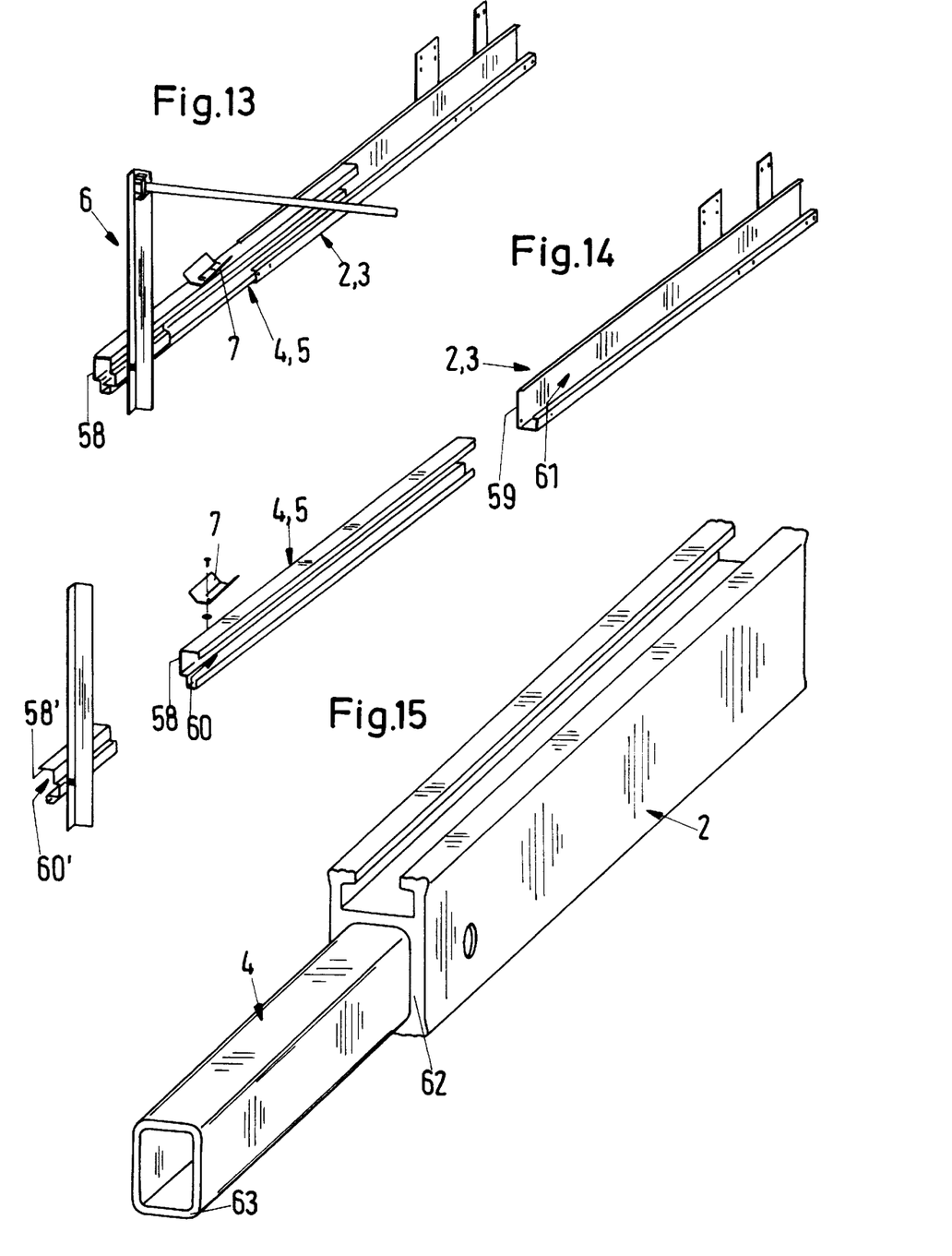
FIGS. 13 to 15 show respective detailed representations of one of the chassis parts with slide rails, which can be introduced into these chassis parts.

In FIGS. 13 and 14, the chassis and sliding rail parts, 2, 3, 4, 5 are shown in their connecting position, as they are in FIG. 3. The components offer different cross-sectional profiles in the form of folded profiles 58, 59 with longitudinal slots 61, 62, to which the add-on parts 6, 7 can be fixed.

In the embodiment of FIG. 15, the sliding rails 4 and the assigned chassis part 2 are constructed in each case in the form of a pipe-in-pipe subassembly of pipe profile parts 62, 63, which fit one inside the other, so that these components, which are manufactured cost effectively as extruded profiled parts, can be fixed in a particularly stable connecting engagement.

Figure 16:
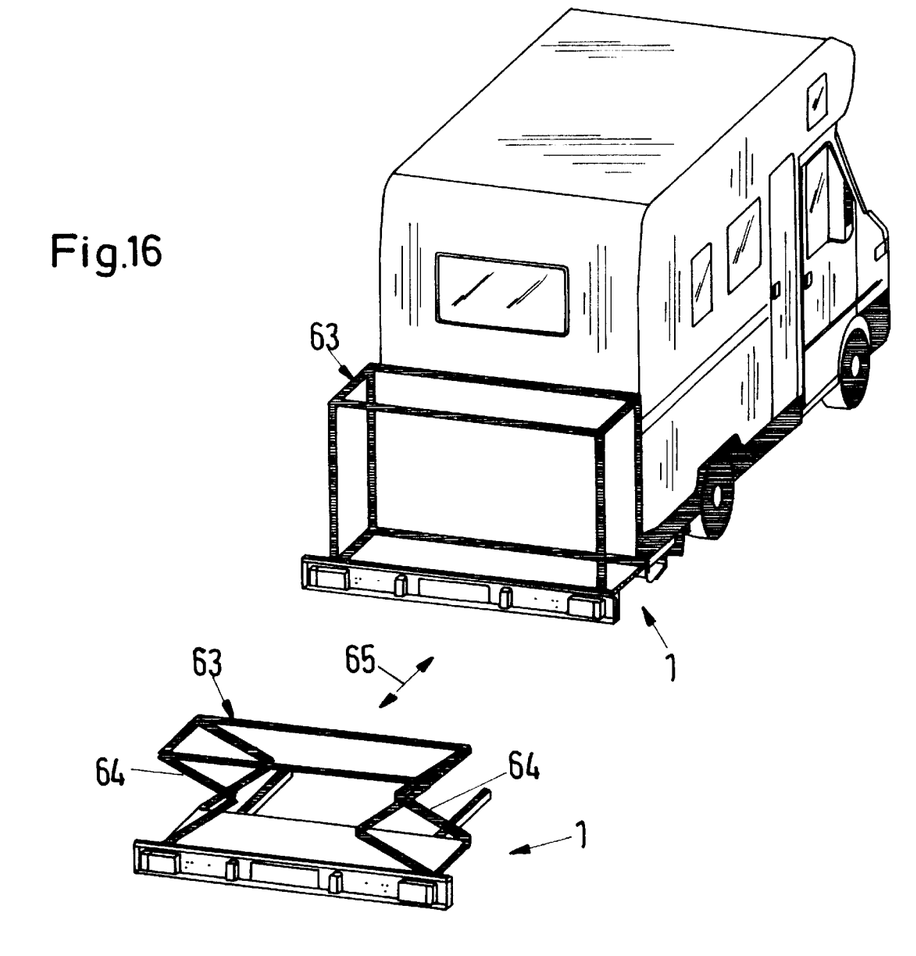
FIG. 16 shows a perspective rear view of a camper with a folding box as add-on part.

In FIG. 16, a further embodiment of a camping car is shown with the support device 1 illustrated in the detailed representation in an add-on position. A folding box 63, forming the add-on part, is supported on this support device 1. The vertical strut 64 of the folding box 63 can be swung out of a flat inoperative or idle position into the use position, so that the folding box 63 can then be pushed together with the support device 1 into the region of the chassis frame (arrow 65).

What is claimed is:

1. A support device for supporting goods in which the supporting device is adapted to be used on a motor vehicle having a chassis, the support device comprising two spaced parallel rail parts adapted to be mounted on said chassis and two sliding rails slidable in each respective rail part for sliding movement between a stored position on each respective rail part and an extended position extending from each respective rail part, holding elements on each of said sliding rails for holding goods when said sliding rails are in said extended position, said holding elements comprising a frame having two spaced struts with one end portion of each strut being respectively supported on one of the sliding rails, said frame further including a bridging strut connected to the other end portion of each respective spaced struts, each of said struts including two subparts and a hinge between said two subparts to enable folding of each strut from an unfolded position in which the two subparts are co-extensive and a folded position in which said two subparts are juxtaposed to one another in a parallel disposition.

2. A support device for supporting goods in which the support device is adapted to be used on a motor vehicle having a chassis, the support device comprising two spaced apart rail parts adapted to be mounted on said chassis and two sliding rails slidable on each respective rail part for sliding movement in a sliding direction between a stored position on each respective rail part and an extended position extending from each respective rail part, said two sliding rails being in a spaced parallel disposition, holding elements on each of said sliding rails, retaining devices mounting said holding elements on said respective sliding rails for movement between holding positions and retained positions, said holding elements being in said holding position for holding goods when said sliding rails are in said extended position, said holding elements being retained on each respective sliding rail in said retained position when said sliding rails are in said stored position, said holding elements comprising a frame having two spaced struts with one end portion of each strut being respectively supported on one of the two sliding rails, at least two pivotal mounting devices pivotably mounting said one end portion of each strut on the respective sliding rail, said frame further including a bridging strut connected to the other end portion of each of said two spaced struts, said bridging strut having an elongated groove, and a goods-holding unit slidably mounted in said groove.

\* \* \* \* \*